Sept. 28, 1954    W. T. REA    2,690,476
HUB CONCENTRATION GROUP TELEGRAPH REPEATER
Filed April 27, 1953    3 Sheets-Sheet 1

INVENTOR
W. T. REA
BY
J. E. Cassidy
ATTORNEY

Sept. 28, 1954 W. T. REA 2,690,476
HUB CONCENTRATION GROUP TELEGRAPH REPEATER
Filed April 27, 1953 3 Sheets-Sheet 2
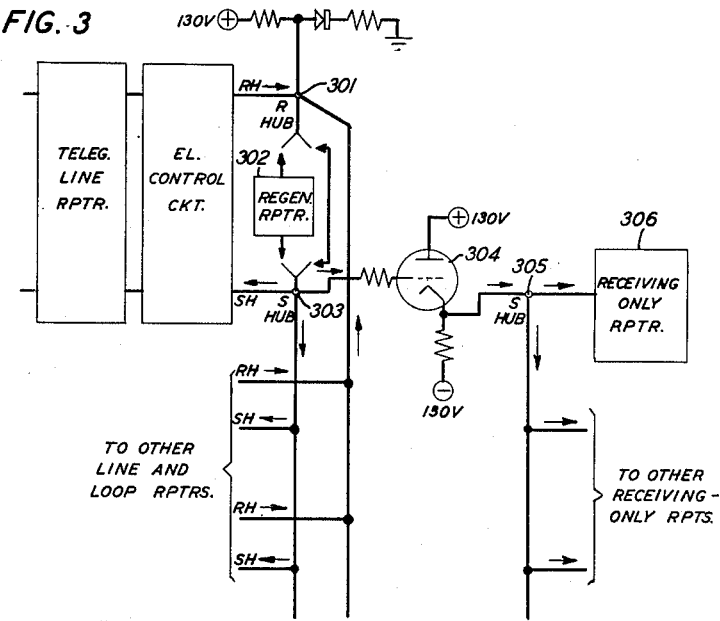
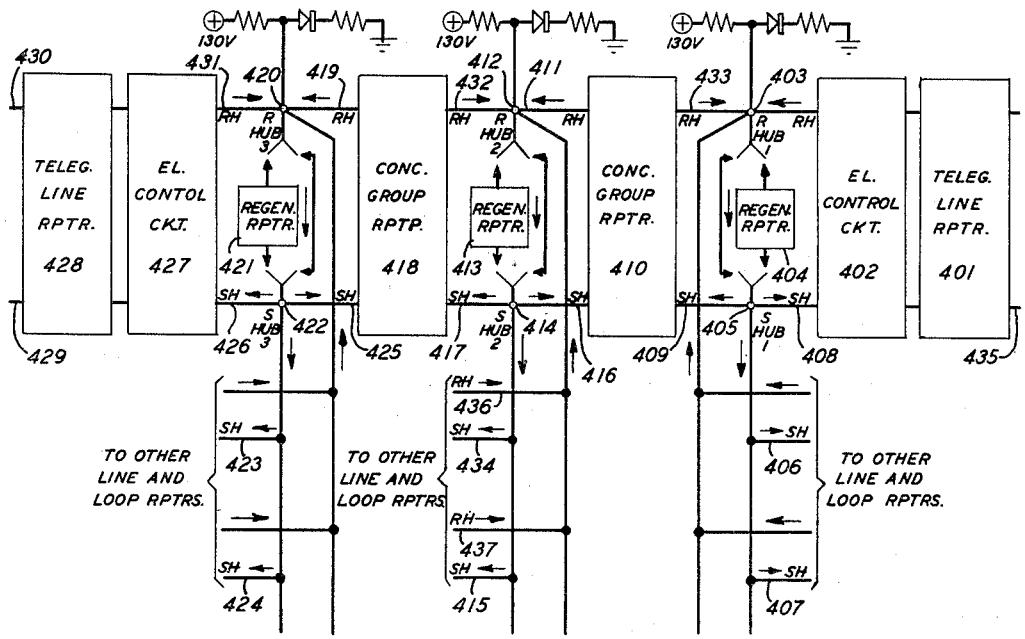
INVENTOR
*W. T. REA*
BY
*J. E. Cassidy*
ATTORNEY

Patented Sept. 28, 1954

2,690,476

UNITED STATES PATENT OFFICE 2,690,476

HUB CONCENTRATION GROUP TELEGRAPH REPEATER

Wilton T. Rea, Manhasset, N. Y., assignor to Bell Telephone Laboratories, Incorporated, New York, N. Y., a corporation of New York Application April 27, 1953, Serial No. 351,345

10 Claims. (Cl. 178—73)

This invention relates to hub telegraph repeater circuits and more particularly to an arrangement wherein a larger number of hub telegraph repeater circuits, than may be effectively interconnected through a single hub, are required to be interconnected so that a plurality of hubs are required.

Hub telegraph repeaters are well known in the art being disclosed, for instance, in Patent 2,612,561 granted to W. T. Rea September 30, 1952, Patent 2,607,852 granted to W. T. Rea August 19, 1952 and Patent 2,634,333 granted to J. R. Davey April 7, 1953.

A hub telegraph repeater system, as described in the patents identified in the foregoing, is an arrangement whereunder a number of telegraph lines and telegraph subscriber loops are interconnected through a single point called the hub in such manner that any one of the lines or loops may transmit telegraph signals and the signals are received by all of the other facilities simultaneously while the signals are prevented from being reflected back to their point of origin. Modern hub telegraph systems, such as disclosed in the patents and application identified in the foregoing, are equipped with electronic control circuits which perform the function of preventing the reflection of the signals to the point of origin. The electronic control circuit performs yet another important function, as is well known. Under certain circumstances, signals may be received on the hub substantially simultaneously from more than one of the connected facilities. As should be obvious, this will cause the mutilation of the signals on the hub due to the interference between the simultaneously received signals. It is desirable under such circumstances to provide a signal identifying the abnormal condition at the points of origin of the interfering signals. It has been explained that, under normal conditions, reflection of signals to the point of origin is prevented. When the abnormal condition obtains, the garbled signals, produced on the hub by the reception simultaneously from the two transmitting stations, are permitted to be reflected back to the points of origin, as well as to all other stations interconnected through the hub. The reception of the garbled signals at the points of origin will serve as an indication of the attempted simultaneous sending. And, finally, an electronic control circuit permits multiway regeneration by means of a single one-way regenerative unit.

The number of facilities, that is lines and loops, that are interconnected through a single hub is limited due to two factors, namely leakage through the receiving legs which are interconnected in parallel to the hub point, and the capacitance of the cabling used in interconnecting the various facilities to the hub. The leakage is a function of the maximum ambient temperature and the capacitance is a function of the length and number of legs. In some cases, the leakage will be the limiting factor and in other cases, the total capacitance of the interconnecting cables will be the limiting factor.

If the number of legs of a concentration exceeds the limit, it becomes necessary to divide them among two or more hubs and interconnect the hubs by what is known in the art as a concentration group repeater. In the present arrangement, the concentration group repeater consists essentially of two electronic control circuits connected back to back by means of relays.

Heretofore it has been assumed that, when it was necessary to interconnect two hubs, to serve essentially as a single hub, when regeneration was required, each one of the individual hubs would require an individual regenerative repeater. A regenerative repeater as is well known is an expensive device. Its function, as is well known, is to restore received signals which have been excessively impaired during transmission and retime and reshape them to standard timing and formation before they are retransmitted. Regenerative repeaters are well known in the art. An example of an electromechanical regenerative repeater is disclosed in Patent 2,105,173 granted to W. J. Zenner January 11, 1938. An example of an electronic regenerative repeater is disclosed in Patent 2,487,181 granted to W. T. Rea November 8, 1949, both of which are hereby incorporated herein by reference as though fully set forth herein.

It is obviously desirable, for reasons of economy, to minimize the number of regenerative repeaters which are required. The present invention makes it possible to serve any number of hub units, each unit comprising a plurality of repeaters, which may be required to be interconnected into what is effectively a single hub, at any telegraph repeater station, through a single regenerative repeater. The invention may be understood from the following description when read with reference to the associated drawing in which:

Fig. 3 shows a hub circuit employing a single regenerative repeater in which the sending hub is interconnected to a second sending hub serving a plurality of repeaters arranged for receiving only, in which the two sending hubs are interconnected by a one-way electronic repeating unit;

Fig. 4 shows the arrangement for interconnecting a plurality of hubs into what is effectively a single hub unit, in which each one of the hubs is served by an individual regenerative repeater;

Before proceeding with a detailed description of the present invention, it is considered desirable to explain in detail the operation of a telegraph line repeater and its associated electronic control circuit, when interconnected as one of the operating units of a single telegraph hub repeater system, as distinguished from the arrangement of the present invention wherein a plurality of individual hubs, each having connected thereto a plurality of individual lines and loops, are connected effectively into a single hub served by a single regenerative repeater.

Figure 5:
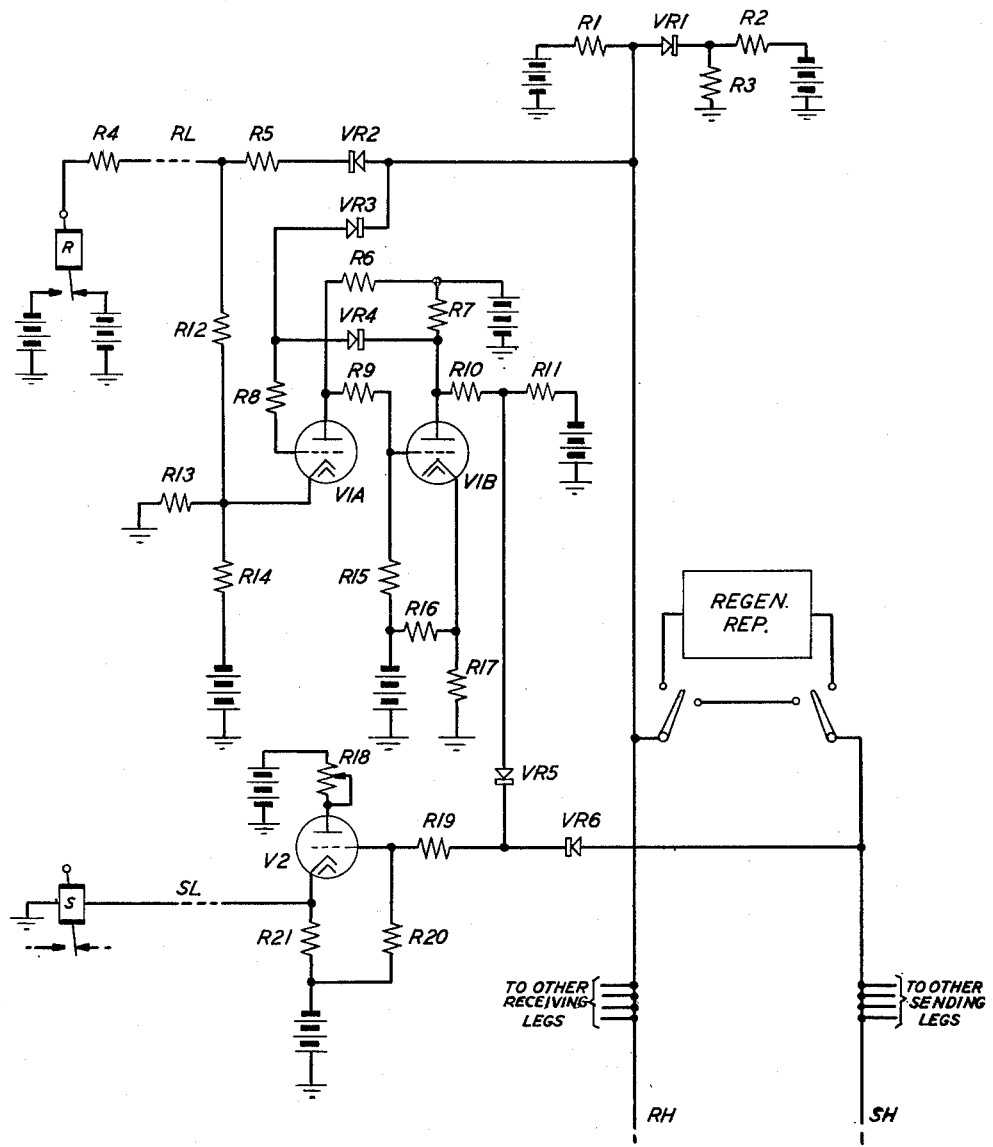
Fig. 5 shows a single telegraph line repeater circuit and its associated electronic control circuit interconnected into a hub. Such arrangements are well known in the art.

Refer now to Fig. 5.

Hub telegraph repeater transmission control circuits, otherwise known as electronic control circuits and also as coupling units, such as is shown in Fig. 5, are not per se claimed as the present invention. Since they are employed in the present invention they are described in detail herein as an aid in understanding the present invention.

In the following, the potential magnitudes cited are for a typical case, but it is to be understood that the operation of the circuit is not limited to the magnitudes cited.

The drawing shows a typical hub-type repeater which may be employed in the present invention. In the arrangement of Fig. 5, it is to be understood, that only one hub is employed, whereas in the present invention a plurality of hubs are interconnected by means of concentration group repeaters in such manner that all hubs are served by a single regenerative repeater. It is assumed that a number of other hub-type repeaters and their individual electronic control circuits are connected to the hub through their respective RH and SH leads shown at the bottom of the figure. A single hub potentiometer comprising varistor VR1 and resistors R1, R2, R3 is connected to the RH lead to serve them all in common. When a regenerative telegraph repeater is provided, the input to the regenerator unit is connected to the RH lead and the output from the regenerator is connected to the SH lead. In this case signals on the SH lead have the same potential conditions for mark and space as those on the RH lead to be described, but are delayed by one-half of one pulse length from the time of their appearance on the RH lead. When a regenerator is not provided the RH lead is directly connected to the SH lead.

It is to be understood that a receiving leg and a sending leg shown extending from the RH and SH conductors in Fig. 5 will be paired for each other hub-type repeater connected to the hub. Each repeater will have a receiving relay R and a sending relay S and all of the other elements shown in Fig. 5 which comprise an individual electronic control circuit, one of which will be furnished for each individual hub-type repeater.

Assuming that the armatures of all R relays have been on their respective marking contacts for some time, the potential of the RH lead is held at plus 60 volts by the potentiometers VR1, R1, R2, and R3 associated with this lead. At this time all RL leads are at approximately plus 130 volts so that a reverse potential difference of about 70 volts is applied to varistors VR2 causing them to have high resistance. The cathodes of all triodes V1A have a potential of plus 20 volts determined by the network consisting of resistances R12, R13 and R14 connecting to the junction of resistances R4 and R5. All triodes V2 are conducting because of the marking potential applied through the direct connection of the SH to the RH hub lead or, when the regenerator is used, because the output of the regenerator associated with the SH lead is at the same potential as that of the RH lead for marking. In the control circuit associated with the R relay, which was last operated to the spacing contact, the left-hand triode V1A is conducting and the right-hand triode V1B is non-conducting. In all other control circuits, the right-hand triode V1B is conducting and the left-hand triode V1A is non-conducting for reasons explained in the following paragraphs.

When one of the R relays is operated to its left-hand or spacing contact, the potential difference across varistor VR2 in the associated control circuit is in the forward direction causing a reduction in resistance between the RH lead and the negative spacing battery. This reduced resistance causes the potential of the RH lead to change from the marking condition of plus 60 volts to a spacing condition of minus 30 volts. The potential at the junction of resistances R4 and R5 in becoming negative lowers the potential of the cathode of triode V1A to minus 45 volts. The change in potential of the RH lead is applied to the grid of triode V1A through the potentiometer formed by varistors VR3 and VR4 which are connected in series between the RH lead and the plate of tube V1B. These varistors are connected so that varistor VR3 has low resistance and varistor VR4 has high resistance whenever the RH potential is negative. Consequently almost the full negative potential of the RH lead appears at the junction of varistors VR3 and VR4.

The negative 30-volt potential on the RH lead causes all triodes V1A, except the one associated with the R relay which has operated to spacing, to become non-conducting. The anodes of these triodes become more positive due to reduction in current flow through resistor R6. This positive condition is applied to the grid of triode V1B through the potentiometer-connected resistors R9 and R15 so that triode V1B becomes conducting and the potential at the plate of triode V1B drops because of increased current flow through resistor R7. The change in potential at the plate of triode V1B is applied to potentiometer-connected resistors R10 and R11 which are returned to minus 130-volt battery and so related that when triode V1B is conducting the junction of resistors R10 and R11 is at a potential slightly more negative than the normal spacing potential of the SH lead. This condition in combination with the condition of the SH lead is applied to the grid of tube V2 through the network formed by elements VR5, VR6, R19 and R20.

Varistors VR5 and VR6 are so connected that when the SH lead is in the positive or marking condition varistor VR6 is low resistance and varistor VR5 is high resistance so that the junction of these varistors is positive. This condition is applied to the grid of triode V2 through potentiometer-connected resistors R19 and R20, which are so related that triode V2 is conducting, causing current to flow in the SL lead in a direction to operate the S relay armature to its right-hand or marking contact, as shown. When the SH lead becomes negative, which occurs at the same time that the RH lead becomes negative unless a regenerative repeater is used, the junction of varistors VR5 and VR6 becomes negative. This negative condition causes triode V2 to cut off. Under this condition current flow through relay S is through resistor R21 and in a direction to operate the armature of relay S to its left-hand or spacing contact.

When the armature of relay R, which has been sending toward the RH hub, returns to the marking contact, varistor VR2 in the associated control circuit becomes high in resistance, causing the potential of the RH lead to rise to plus 60 volts. This potential is applied through the potentiometer formed by varistors VR3 and VR4 to the grid of tube V1A. In control circuits other than the one associated with the repeater in which the R relay is sending toward the hub, the potential at the anode of triode V1B is approximately zero so that with the RH lead positive, varistor VR3 is high resistance and varistor VR4 low resistance. In these control circuits, therefore, triode V1A is held cut off by the anode condition of triode V1B. This is the case since the cathodes of triodes V1A in these circuits are at plus 20 volts and their grids are controlled by the potential of the anodes of the associated triodes V1B which are at approximately 0 volts. Consequently the potential applied to the grid of triode V2 through varistor VR5 does not change. When the plus 60-volt marking signal arrives at the SH hub the resistance of varistor VR6 drops and the resistance of varistor VR5 rises so that the marking condition of the SH hub is applied to triode V2 causing it to conduct. Conduction of triode V2 causes the impedance between the SL lead and positive battery to be lowered so that the direction of current in the S relay reverses and the armature of this relay is operated to the marking contact.

In the circuit which is sending toward the hub, changes in the potential of the RH hub lead are applied to the grid of triode V1A, as in all other control circuits, but are accompanied by changes in cathode potential due to the connection between the cathode of triode V1A and the RL lead through the potentiometer formed by resistors R12, R13 and R14. Thus, when the potential applied through resistor R8 to the grid of triode V1A is minus 30 volts, since the armature of relay R in the circuit which is sending toward the hub is connected to negative 130-volt battery for the spacing condition, the potential of the cathode of tube V1A is approximately minus 45 volts which gives a net positive drive of 15 volts on the grid of this tube. This positive drive causes triode V1A to remain conducting or to become conducting if it has previously been non-conducting. The resulting negative condition at the anode of triode V1A causes triode V1B to remain or become non-conducting so that the potential of the anode of triode V1B remains or becomes positive. This positive condition is applied through resistors R10 and R11 and varistor VR5 to the grid of triode V2. When the spacing signal arrives at the SH hub the potential difference across varistor VR6 is such as to make it high resistance. At the same time the potential difference across varistor VR5 is such as to make it low resistance, so that the positive holding voltage through varistor VR5 is the controlling factor in keeping triode V2 conducting. This effect prevents relay S from repeating back toward the originating end of the circuit the signals appearing at the armature of relay R.

When the armature of relay R returns to the marking contact and the RH potential returns to plus 60 volts, the potential difference across varistors VR3 and VR4 is in a direction to make varistor VR3 low resistance and varistor VR4 high resistance. Consequently the potential applied to the grid of triode V1A through resistor R8 is nearly plus 60 volts. At the same time the cathode of triode V1A, under control of the RL lead, rises to approximately plus 20 volts so there is a net positive drive of plus 40 volts to keep triode V1A in a conducting condition. In this manner the holding condition on triode V2, once set up, is maintained in the last control circuit to send toward the RH hub. As explained in the preceding section, this holding condition is removed as soon as another control circuit, associated with the same RH lead, transmits toward the hub.

Whenever the armatures of two or more R relays, associated with the same hub circuit, are on the spacing contacts at the same time, the potential of the RH lead falls below the minus 30-volt normal spacing condition due to the abnormally low impedance between negative spacing battery and the RH potentiometer. This change is facilitated by an increase in resistance of varistor VR1 so that the potential of the RH lead becomes approximately minus 60 volts when two R relays are simultaneously spacing and somewhat more negative when more than two R relays are spacing at the time time. Since the resistance of varistor VR3 is low under this condition, almost the full negative potential appears on the grid of triode V1A. Since, in the circuits sending toward the hub the cathode potential of triode V1A is approximately minus 45 volts, this triode is cut off. Because of the interconnection between triodes V1A and V1B, as previously explained, the latter triode becomes conducting and hence the hold on the output triode V2 is released. This allows a spacing condition of the SH hub to be applied to the grids of triode V2 in the circuits causing the multiple space condition, as well as in all other circuits. The sending operators on these circuits are thereby informed that an abnormal condition exists. When a normal condition is restored by the return of all R relays, except one to a marking condition, the release condition is maintained in all control circuits except the one associated with the last R relay to be in the spacing condition. On this latter control circuit the holding condition is established and, as previously explained, this condition of the control circuits is maintained until some other circuit sends toward the hub.

Magnitudes of elements

For a typical case the magnitudes or descriptions of the elements of the circuit are as follows:

| | |
|---|---|
| R1—8,880 ohms | R19—0.27 megohm |
| R2—49,500 ohms | R20—2.4 megohms |
| R3—14,840 ohms | R21—17,000 ohms |
| R4—2,000 ohms | VR1—1 unit germanium |
| R5—2,170 ohms | VR2—4 unit germanium |
| R6—0.47 megohm | VR3—2 unit germanium |
| R7—0.1 megohm | VR4—3 unit germanium |
| R8—2.2 megohms | VR5—2 unit germanium |
| R9—4.7 megohms | VR6—2 unit germanium |
| R10—0.56 megohm | Triode V1A ⎱ 2C51 twin |
| R11—1.8 megohms | Triode V1B ⎰ triode |
| R12—25,000 ohms | Triode V2—2C51 twin triode two halves in parallel |
| R13—15,000 ohms | |
| R14—47,000 ohms | |
| R15—3.9 megohms | Potentials 130 v. + or −, as indicated, except spacing contact of R relay which is −105 v. |
| R16—7,500 ohms | |
| R17—2,200 ohms | |
| R18—5,000 ohms | |

Figure 1:
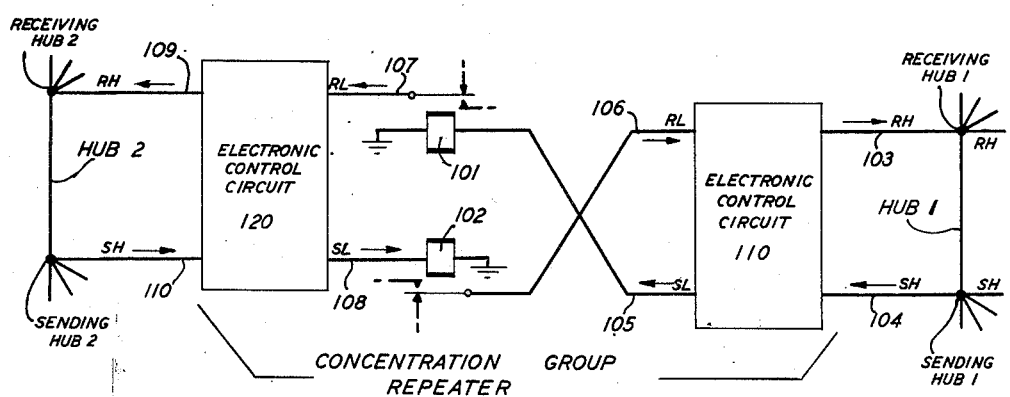
Fig. 1 shows a concentration group repeater.

Refer now to Fig. 1.

In the following description it will be assumed that regenerative repeaters are not required.

Fig. 1 shows an arrangement for interconnecting two hubs so that they effectively operate as a single hub. Essentially, the arrangement comprises two electronic control circuits, such as described under Fig. 5 in the foregoing. The two electronic control circuits 110 and 120 are interconnected back to back by means of two relays, relay 101 and relay 102. The individual hubs are indicated as hub 1 shown at the right, and hub 2 shown at the left. Other lines and loops connected to the receiving and sending legs of hub 1 and hub 2 are indicated by the spurs connected to the receiving hub and sending hub points of each hub. The RH lead 103 and the SH lead 104, shown at the right in Fig. 1, connect to the receiving hub and sending hub of hub 1, respectively. It will be assumed that signals are incoming from a receiving leg RH of another individual circuit connected to hub 1, to which leads 103 and 104 connect. The signals will be passed from the receiving hub of hub 1 to the sending hub of hub 1 then out over SH lead 104, which corresponds to the sending leg of the electronic control circuit described in Fig. 5 in the foregoing. It will be assumed that the sending leg of the electronic control circuit is unblocked as only one spacing signal is being received at the moment on hub 1. The signals will, therefore, pass through the sending leg of the electronic control circuit and out over SL conductor 105 to operate relay 101. The signals will be impressed from the contacts associated with the armature of relay 101 through receiving leg 107 and will pass through the upper branch of the electronic control circuit 120 and out over RH lead 109 to the receiving hub of hub 2. From the receiving hub of hub 2 the hub signals will pass through the hub core of hub 2 to the sending hub of hub 2 and then will pass out through other sending branches connected to sending hub 2. Because of the fact that the signals appearing on hub 1 pass through the receiving leg of electronic control circuit 120, the electronic control circuit 120 will perform its usual blocking function to prevent the reflection or retransmission of the signals from the sending hub of hub 2 back through SH lead 110 and electronic control circuit 120 to hub 1.

If signals are being received on the receiving hub of hub 2, from some other connected facility, at some other time, they will pass through the hub core of hub 2 to its sending hub and through SH lead 110 and the sending leg of electronic control circuit 120 through SL conductor 108 and the winding of relay 102 to operate relay 102. These signals will actuate the armature of relay 102, between its opposing contacts, to repeat the signal through RL conductor 106 and the upper or receiving leg of electronic control circuit 110 and through RH conductor 103 to the receiving hub of hub 1. From this point they will pass through the hub core of hub 1 to the sending hub of hub 1 and then pass out through other sending legs connected to sending hub 1. Since these signals pass through the receiving leg of electronic control circuit 110, electronic control circuit 110 will block its associated sending leg so that when the signals arrive at the sending hub of hub 1 they will not be repeated back to hub 2.

The arrangement of Fig. 1 also affords the double space by-pass function described for the arrangement of Fig. 5, that is to say, when more than one facility, connected into the system, attempt to transmit simultaneously, mutilated signals, characteristic of the abnormal condition, are produced and transmitted to all stations including the ones which are sending simultaneously. This is achieved as follows:

It will be assumed first that both signals are impressed on receiving hub 1 from RH leads connected directly thereto other than RH conductor 103. As a result of the simultaneous reception of more than one spacing signal on receiving hub 1, the electronic control circuit 110 and each of the electronic control circuits associated individually with the other facilities connected to receiving hub 1 will be unblocked, so that the spacing signals can pass through all SH leads connected to the sending hub of hub 1. These signals will be mutilated and will be received by each facility connected to hub 1. They will pass to the sending hub of hub 2 and out over the SH conductors connected to hub 2 in the manner described above. The reception of the mutilated signals at all stations connected to the system will serve as an indication of the attempted simultaneous sending and the stations that are simultaneously sending will stop sending.

Let it be assumed that one station connected directly to receiving hub 1 is transmitting and simultaneously another station connected directly to receiving hub 2 starts sending. The signals from the station connected directly to receiving hub 2 will be transmitted through electronic control circuit 120 and electronic control circuit 110, in the manner heretofore described, producing a double space condition on receiving hub 1. Normally, in signals passing from receiving hub 2 to receiving hub 1, electronic control circuit 110 will be blocked to prevent reflection of the signals from sending hub 1. Now, however, since two spacing signals, on occasions, appear simultaneously on receiving hub 1, electronic control circuit 110 and all other electronic control circuits connected to receiving hub 1 will be unblocked and the mutilated signals will pass out over each SH lead, including SH lead 104, and back to hub 2 and out over the SH leads connected to sending hub 2, as an indication of the attempted simultaneous sending.

Refer now to Fig. 4.

In the following description it will be assumed that three hubs, hubs 1, 2 and 3, are interconnected at the same repeater station and that regenerative repeaters are required between the receiving legs RH and the sending legs SH of each one of the hubs. Fig. 4 shows one method of interconnection of three hubs under such circumstances.

It will be assumed that signals are incoming through telegraph line repeater 401 and its associated electronic control circuit 402. The signals will appear on receiving hub 403 of hub 1. They will pass through regenerative repeater 404 to the sending hub 405 of hub 1. They will pass out over SH leads, such as SH leads 406 and 407, and will be prevented from passing through SH lead 408 associated with electronic control circuit 402 from which the incoming signals were received. The signals will pass also through SH lead 409 and through the concentration group repeater 410. Concentration group repeater 410, it is to be understood, comprises two electronic control circuits, such as electronic control circuits 110 and 120, two relays such as relays 101 and 102, and their interconnecting wiring as described for Fig. 1. The signals will pass through RH lead 411 to hub 412 which is the receiving hub of hub 2. They will then pass through regenerative repeater 413 to sending hub 414 which is the sending hub of hub 2. They will pass through the SH leads connected to sending hub 2 such as SH leads 434 and 415. They will be prevented from passing through SH lead 416 since the path therethrough will be blocked by an electronic control circuit in concentration group repeater 410, corresponding to the electronic control circuit 120 in Fig. 1. The signals will pass through SH lead 417 of concentration group repeater 418 and out through RH conductor 419 to hub 420 which is receiving hub 3. They will pass through regenerative repeater 421 to sending hub 422 which is sending hub 3. They will pass through SH leads 423 and 424 to other facilities and will be prevented from passing through SH lead 425 for reasons which should be understood from the foregoing. They will pass through SH lead 426, electronic control circuit 427, telegraph line repeater 428 and over conductor 429 to a connected facility.

Signals incoming over receiving leg 430 will pass through telegraph line repeater 428, electronic control circuit 427, RH conductor 431 and appear on receiving hub 420. They will pass through regenerative repeater 421 and appear on sending hub 422. They will pass through SH leads 423 and 424 and will be prevented from passing through SH lead 426. They will pass through SH lead 425, through concentration group repeater 418, RH lead 432 and appear on hub 412. They will pass through regenerative repeater 413 and appear on sending hub 414. They will pass through SH leads, such as SH leads 434 and 415, and be prevented from passing through SH lead 417. They will pass through SH lead 416, through concentration group repeater 410, RH lead 433 and appear on hub 403. They will pass through regenerative repeater 404 and appear on sending hub 405. They will pass through SH leads, such as SH leads 406 and 407, and be prevented from passing through SH lead 409. They will pass through SH lead 408, through electronic control circuit 402, telegraph line repeater 401 and over sending conductor 435 to the connected facility.

Signals incoming over an RH lead, such as RH lead 436, will appear on receiving hub 412. They will pass through regenerative repeater 413 and appear on sending hub 414. From this point, they will pass through both SH leads 416 and 417, concentration group repeaters 410 and 418, RH leads 433 and 419 and appear on receiving hubs 403 and 420. Signals incoming to sending hub 414 from RH lead 436 will be prevented from passing through its associated SH lead 434 because of a block imposed by an individual electronic control circuit, not shown, associated with these conductors. The signals appearing on hub 403 will pass through regenerative repeater 404 and appear on sending hub 405. They will be transmitted through SH leads such as SH leads 406, 407 and 408. They will be prevented from passing through SH lead 409 because of an electronic control circuit corresponding to electronic control circuit 110 of Fig. 1 associated with concentration group repeater 410. The signals transmitted through SH lead 408 will pass through electronic control circuit 402, telegraph line repeater 401 and out over conductor 435 to the connected facility.

The signals appearing on receiving hub 420 will pass through regenerative repeater 421 and appear on sending hub 422. They will pass through SH conductors such as SH conductor 423 and 424. They will be prevented from passing through SH conductor 425 because of a block imposed by an electronic control circuit, corresponding to electronic control circuit 120 of Fig. 1, which is included in concentration group repeater 418. They will pass through SH conductor 426 through electronic control circuit 427, telegraph line repeater 428 and sending conductor 429 to the connected facility.

If more than one facility, forming part of the system shown in Fig. 4, attempt to transmit simultaneously, a double space potential condition will be produced on the receiving hubs 403, 412 or 420. As a result of this, the electronic control circuits connected to the individual hub, on which the double space condition appears, will be unblocked so that the mutilated signals will be transmitted to all connected facilities. The manner in which this is achieved should be apparent from the foregoing.

It will be observed that the arrangement per Fig. 4 requires an individual regenerative repeater for each hub, that is to say, regenerative repeater 404 is required for hub 1, regenerative repeater 413 is required for hub 2 and regenerative repeater 421 is required for hub 3. It will also be observed that any signal arriving at any hub is required to pass through each one of the regenerative repeaters associated with each one of the hubs.

There are two obvious disadvantages to the arrangement of Fig. 4: One, regenerative repeaters are quite expensive, and two, since, as is well known, a regenerative repeater introduces a delay between the reception and transmission of a signal, equal in duration to approximately one-half the duration of a signal element, three such delay intervals would be introduced when the signals are required to pass through three regenerative repeaters as shown in Fig. 4. This delay, it is to be understood, would be introduced at a single repeater station where three hubs will be required to interconnect all of the facilities required to be connected into one concentration group. If regenerative repeaters were required also at other repeater points, the delay would be considerable and would increase the frequency of simultaneous sending.

Figure 2:
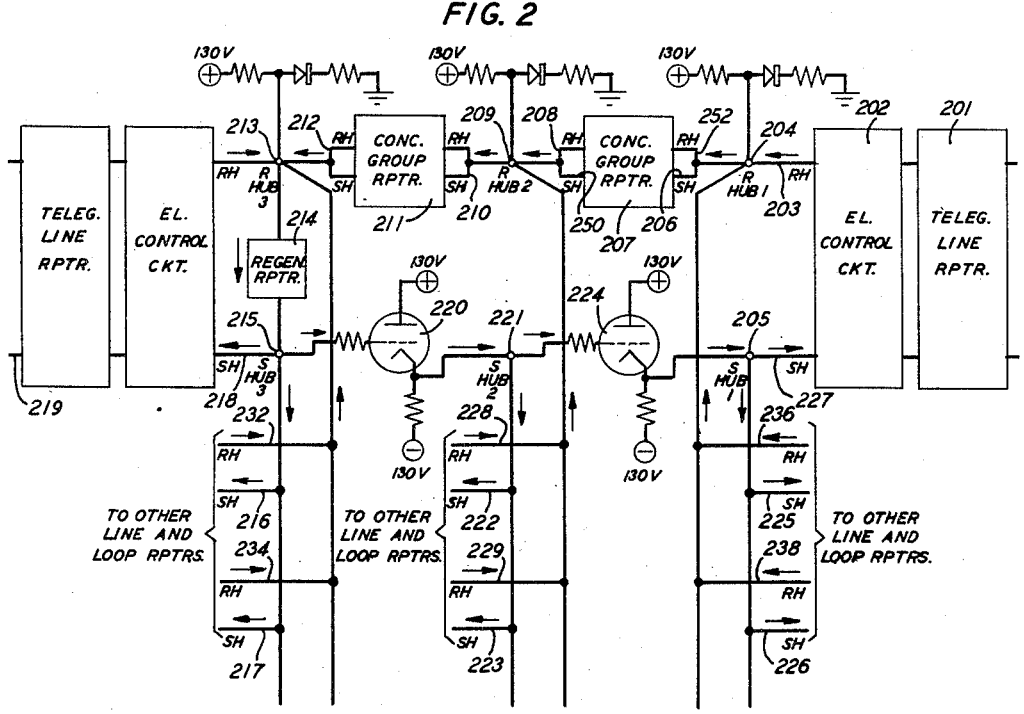
Fig. 2 shows three hubs interconnected through two concentration group repeaters all served by a single regenerative repeater.

Refer now to Fig. 2, which shows an improved arrangement wherein three hubs are required to accommodate the facilities required to be interconnected in a single concentration group and regeneration is required, in which arrangement a single regenerative repeater, rather than three regenerative repeaters, will suffice. The economy in regenerative repeaters is achieved largely through a novel arrangement of the concentration group repeaters interconnecting the hubs. Two concentration group repeaters are required to interconnect the three hubs as in the arrangement per Fig. 4. However, the RH conductor and the associated SH conductor on each side of each concentration group repeater are tied together and each pair so tied is connected by a single conductor to an individual receiving hub. Further, a single electronic one-way repeater is used to connect each sending hub to the adjacent sending hub. Thus, to interconnect three sending hubs, two one-way electronic sending repeaters are required.

In Fig. 2, signals incoming through telegraph line repeater 201 and the electronic control circuit 202 pass through RH conductor 203 and appear on the receiving hub 204. Receiving hub 204 is not connected directly to sending hub 205 through an individual regenerative repeater. The signals pass through SH conductor 206, through concentration group repeater 207 and RH conductor 208 to receiving hub 209 which is receiving hub 2. They pass through SH conductor 210, concentration group repeater 211 and RH conductor 212 to receiving hub 213 which is receiving hub 3. They pass through regenerative repeater 214 to sending hub 215 which is sending hub 3. From sending hub 3, the signals pass through SH conductor 216 and 217 as well as through SH conductor 218 and the associated electronic control circuit and telegraph line repeater to sending conductor 219. The signals appearing on sending hub 215 are impressed through triode 220 and appear on sending hub 221, which is sending hub 2. From sending hub 2, the signals pass through SH conductors 222 and 223 as well as through triode 224 to sending hub 205 which is sending hub 1. From sending hub 205, the signals pass through SH conductor 225 and 226. They are prevented from passing through SH conductor 227 because electronic control circuit 202 will be blocked as should be understood from the foregoing.

Spacing signals incoming from any of the RH conductors, connected directly to receiving hub 2, such as RH conductor 228, will pass through SH lead 250, concentration group repeater 207 and RH conductor 252 to receiving hub 204 of hub 1. The spacing signal cannot pass from receiving hub 204 directly to S hub 205, as S hub 205 is not connected directly to receiving hub 204. However, the spacing potential appearing on the RH hub 204 will insure that all the associated SH leads are open except SH lead 206 associated with RH conductor 252 from whence the signal came to RH hub 204. Thus if the last spacing signal incoming to the system came from some one of the other RH conductors connected to RH hub 204, the associated SH conductor of which would be thereupon locked and which would remain locked thereafter, it will now be opened, since another facility is now transmitting through the system and signals therefrom are required to pass through the last SH lead which was locked. The passing of the spacing signal condition to RH hub 204 also enables the production of a double space condition thereon should any other facility directly connected thereto impress another spacing condition thereon simultaneously. The spacing signals incoming to receiving hub 2, from conductor 228 will pass through SH lead 210, concentration group repeater 211, RH conductor 212, hub 213 and regenerative repeater 214 to hub 215. From hub 215, the signals will pass through SH conductor 218 and through the associated electronic control circuit and the telegraph line repeater to conductor 219. They will also pass through SH conductors, such as conductors 216 and 217 and through electronic control circuits and telegraph line repeaters associated therewith, not shown, to the connected facility. They will pass through triode 220 and be impressed on sending hub 221. From hub 221 the signals will pass to the other SH leads thereto connected. Since the signals are assumed to be incoming from RH lead 228, its associated sending or SH lead 222 will be blocked by an electronic control circuit, not shown, interconnecting RH conductors 228 and 222. They will pass, however, through other SH conductors such as 223. Signals appearing on sending hub 221 will pass through triode 224 to sending hub 205. From hub 205, the signals will pass through all SH conductors thereto connected, such as SH conductors 225, 226 and 227, to the connected facilities.

In a similar manner, signals incoming over any RH conductor connected to receiving hub 3, such as RH conductor 232, will be impressed on receiving hub 2. The signal will be passed backward through concentration group repeater 211 and 207 to receiving hubs 2 and 1, in the manner described, for the passage of a spacing signal from receiving hub 2 to receiving hub 1 and for the same reasons. The signals will pass through the regenerative repeater 214 to sending hub 215. From sending hub 215, the signals will pass through all SH conductors connected to sending hub 215, other than the SH conductor 216 associated with RH conductor 232 from which the signals are assumed to be incoming. The signals appearing on hub 215 will pass through triode 220 to sending hub 221 and through triode 224 to sending hub 205. From each of sending hubs 221 and 205, the signals will be transmitted to all SH conductors thereto connected.

From the foregoing it should be apparent that signals incoming from any RH lead in the system will be directed through the single regenerative repeater 214 and will pass to all other SH conductors, except the SH conductor, associated with the RH conductor from which the signals are being received.

It will now be assumed that two spacing signals are simultaneously received on receiving hub 204 from the RH leads of two facilities thereto connected, such as RH conductors 236 and 238. This will produce a double space by-pass condition and a distinguishing potential condition, on all RH conductors connected to hub 204, unblocking each associated electronic control circuit, such as electronic control circuit 202 and the electronic control circuit in the concentration group repeater 207. Each electronic control circuit will thereupon unlock its associated sending conductor SH. The mutilated signals will pass through SH conductor 206, through concentration group repeater 207, RH conductor 208 and appear on hub 209. They will pass through SH conductor 210, concentration group repeater 211 and RH conductor 212 and appear on receiving hub 213. They will pass through regenerator 214 to sending hub 215. They will be transmitted to all the SH conductors connected through hub 215. They will also pass through triode 220 to sending hub 221. They will pass through all SH conductors connected to sending hub 221. They will pass through triode 224 to hub 205. They will pass through all SH conductors connected to hub 205, including the SH conductors, associated with the RH conductors which are simultaneously transmitting the signals to hub 204. Mutilated signals will thus be transmitted to every facility interconnected into the system of Fig. 2, as an indication of the abnormal condition. Double space potential conditions produced on receiving hub 2 or 3 will be similarly propagated through the system in a forward direction.

From the foregoing, it should be apparent that not only does the system of Fig. 2 transmit normal communication signals, received from any facility in the system of Fig. 2 to all other facilities, other than the one from which they are being received, through a single regenerative repeater, but the system also transmits mutilated signals when more than one station attempt to transmit to all of the stations connected into the system of Fig. 2 including those from which signals are being simultaneously transmitted.

Refer now to Fig. 3.

Fig. 3 shows an arrangement for interconnecting a single combined receiving and sending hub to another separate sending hub, to which separate sending hub are connected a plurality of receiving-only repeaters. In this arrangement a single one-way space discharge repeater is employed to interconnect the two sending hubs. Signals impressed on the receiving hub 301 from the RH leads of any of the facilities connected to hub 301 pass through regenerative repeater 302 to the sending hub 303. From the sending hub 303 the signals are transmitted out over the SH leads, except the SH lead associated with the control circuit from which the signals are being received. From sending hub 303 the signals are passed through triode 304 to sending hub 305. A plurality of repeaters arranged for receiving only, such as repeater 306, are connected to sending hub 305. The signals will be transmitted to each of these receiving-only repeaters.

If two RH conductors transmit signals simultaneously to receiving hub 301, a characteristic potential identifying the condition will be impressed on all RH conductors connected to hub 301. All RH leads connected to hub 301 will unlock their associated electronic control circuit to permit mutilated signals to be transmitted through the associated SH conductors. The mutilated signals will also pass through triode 304 and appear on hub 305. From hub 305 the mutilated signals will be transmitted to each receiving-only repeater, such as repeater 306.

What is claimed is:

1. In a hub repeater telegraph system, a first hub, a plurality of hub telegraph repeaters directly connected to said hub, an individual transmission direction control circuit connected to each of said repeaters, a second telegraph hub, a plurality of hub telegraph repeaters directly connected to said second hub, an individual transmission direction control circuit connected to each of said hub telegraph repeaters connected to said second hub, a concentration group repeater interconnecting said first hub and said second hub, said concentration group repeater comprising a first and a second transmission direction control circuit, each of said control circuits having a space discharge device therein and means connected to said space discharge devices responsive to potential conditions impressed on said hubs for controlling the direction of transmission through said repeaters between said hubs.

2. A telegraph hub repeater system, in accordance with claim 1, including means for discriminating between normal and abnormal signaling conditions impressed on said hubs.

3. A hub telegraph repeater system, in accordance with claim 1, having means therein for discriminating between a single space condition and a double space condition appearing on said hubs.

4. A hub telegraph repeater system, in accordance with claim 1, and a regenerative repeater individual to each of said hubs for regenerating signals passing through said hubs.

5. A hub telegraph repeater system, in accordance with claim 1, a single regenerative repeater connected directly to said first hub and means in said system for directing signals received through either of said hubs through said single regenerative repeater.

6. A hub telegraph repeater system, in accordance with claim 1, a receiving leg and a sending leg connected to each side of said concentration group repeater, said receiving leg connected to said sending leg individually on each of said sides, a single conductor interconnecting said first hub to said interconnected legs on one side of said concentration group repeater and another single conductor interconnecting said second hub to said interconnected legs on the other side of said concentration group repeater.

7. In a hub telegraph repeater system, a first hub, a second hub, a concentration group repeater, a first and a second transmission control circuit in said concentration group repeater, space discharge means in each of said control circuits for controlling the direction of transmission through said concentration group repeater between said hubs, a sending leg and a receiving leg extending from each side of said concentration group repeater, said sending leg and said receiving leg on each side directly interconnected and a single conductor individual to each pair of legs so formed connecting each of said pairs to a respective one of said hubs.

8. In a hub telegraph system, a plurality of hubs, a plurality of hub telegraph repeaters connected individually to each of said hubs, a concentration group repeater interconnecting each of said hubs to another of said hubs, said concentration group repeater comprising two transmission direction control circuits, sending and receiving legs extending from each side of each of said concentration group repeaters, said legs on each side of said repeaters individually interconnected, a single conductor extending from each of said interconnections to a respective hub, a receiving hub and a sending hub in each of said hubs, a regenerative repeater interconnecting said receiving hub and said sending hub in one of said hubs and means in said system for directing signals, incoming to any of said hubs, through said single regenerative repeater.

9. A system in accordance with claim 8 and an individual space discharge device interconnecting each of said sending hubs so as to transmit the regenerated signals between said sending hubs.

10. In a hub telegraph repeater system, a telegraph hub comprising a receiving hub and a first sending hub, a plurality of telegraph hub repeaters, each comprising a transmission direction control circuit, connected to said hubs, a second sending hub, an interconnection between said first sending hub and said second sending hub, a space discharge device in said interconnection for repeating signals between said sending hubs and a plurality of receiving-only repeaters connected to said second sending hub.

References Cited in the file of this patent

UNITED STATES PATENTS

| Number | Name | Date |
| --- | --- | --- |
| 2,105,173 | Zenner | Jan. 11, 1938 |
| 2,481,919 | Fitch | Sept. 13, 1949 |
| 2,487,181 | Rea | Nov. 8, 1949 |
| 2,539,550 | Rea | Jan. 30, 1951 |
| 2,607,852 | Rea | Aug. 19, 1952 |
| 2,612,561 | Rea | Sept. 30, 1952 |
| 2,634,333 | Davey | Apr. 7, 1953 |